Jan. 13, 1959
J. C. ZIEGLER
2,868,028
ANTI-BACKLASH GEAR TRAIN
Filed Aug. 31, 1953
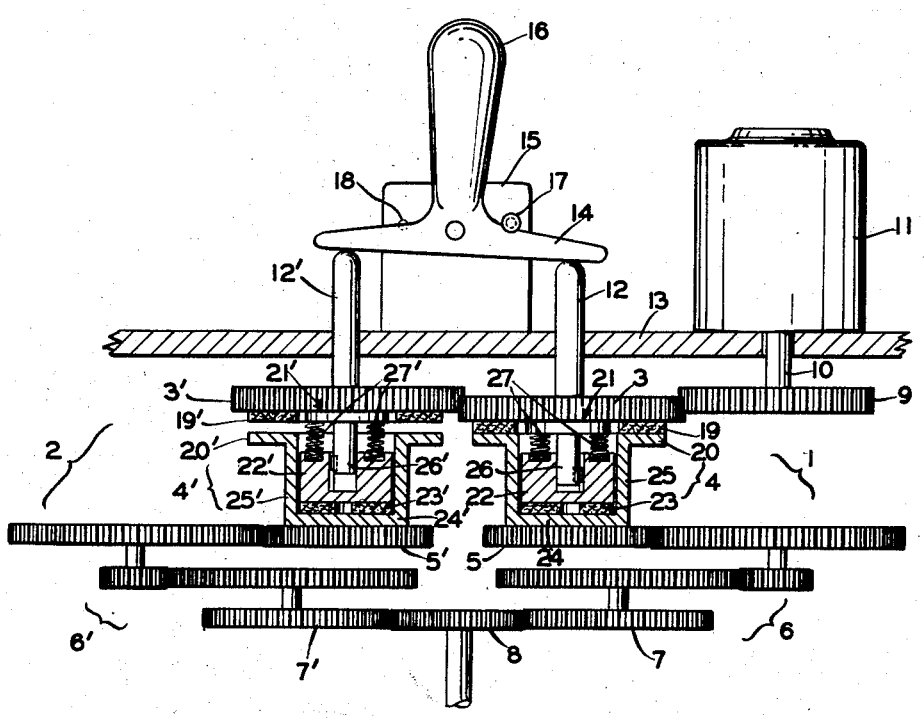
INVENTOR
JOHN C. ZIEGLER
BY
ATTORNEY

United States Patent Office 2,868,028
Patented Jan. 13, 1959

2,868,028

ANTI-BACKLASH GEAR TRAIN

John C. Ziegler, Maywood, N. J., assignor to Bendix Aviation Corporation, Teterboro, N. J., a corporation of Delaware Application August 31, 1953, Serial No. 377,490

1 Claim. (Cl. 74—409)

This invention relates to gear drive apparatus, and more particularly to an arrangement for preventing backlash between meshing gears.

The general purpose is to provide a novel means for preventing backlash that is espcially suitable for releasably driven gear trains, where the release of the drive connection tends to produce backlash, due to the momentum of the gears, which changes the pressure to the opposite sides of the gear teeth. This can be accomplished by applying to the gear train a torque sufficient to maintain the gear teeth in engagement when the drive is released, but insufficient to affect materially the drive of the train.

The invention is especially applicable to reversing gear drive arrangements, in which a driven gear is meshed with two gear units, which may be single gears or gear trains, and are alternatively actuated to rotate the driven gear in either direction. In this arrangement, when the first unit is used for driving, the second unit is rotated through the driven gear. This maintains the teeth of the driven gear and the second unit gears with the proper gear faces in contact for drive by the second unit when desired; but in the absence of special provisions, if the drive is to be shifted from the first to the second unit, on releasing the drive of the first unit the gears of the second unit tend to shift to opposite contact faces, and then back to the same faces when power is applied to the second unit.

The shocks and noise are of course objectionable; but in addition there is a slight delay, which can likewise be objectionable where the gearing is used in scientific apparatus. For instance, gear trains in such apparatus are driven by small servomotors, which often are a part of a sensitive and complicated electrical system such as the systems used in mathematical computers and in automatic control systems for aircraft. In such arrangements, reversal of gears is frequently required; and since the reversal of an ordinary gear train involves lost motion which is objectionable, two alternatively actuated trains revolving in opposite directions are preferable, since with this arrangement the same faces of the gears are always engaged during driving. Thus no lost motion is encountered in reversing direction, provided there is no backlash. Moreover, such an arrangement obviates the need for highly accurate workmanship in shaping the teeth to prevent play, and thereby eliminates a source of material expense in manufacturing precision apparatus.

An object of the invention is to provide a novel backlash-preventing arrangement especially adapted for use in this type of apparatus, and in particular, new means for retarding the idle gear train so as to prevent backlash. A more specific object is the provision of a novel arrangement including means for applying a counteracting torque to both trains of a reversing gear unit in the indicated manner. Such duplex gear arrangements are most effectively driven through clutches; and a further object is to provide novel counteracting means that is efficiently combined with a clutch construction.

Where a friction clutch is used, it may be released only partially, so as to retain enough frictional engagement with the gear train to keep the teeth in proper engagement; but such an arrangement has a number of drawbacks. The clutch must have a sufficiently large friction area to assure positive driving engagement; and it is difficult, and generally impractical, to adjust the pressure of this relatively large area so as to be sure to get only enough friction to keep the teeth in engagement, without either unnecessary friction that will increase wear and power requirements, or slipping under the shock of reversal that will permit backlash.

The invention is applicable to gear trains having a drive gear, a driven gear unit including a gear meshing with the drive gear, and releasable means for driving the drive gear; and comprises the use of suitable means for applying a counter torque to the driven gear unit when the drive means is released, so that the teeth of the driven gear unit are forced into such contact as to eliminate backlash. It is especially advantageous in a duplex train comprising a driven element rotatable in either direction, with two gear units each of which has a continuous driving connection with the driven element, and means for alternatively driving either gear unit. In this application of the invention a counter torque applying means becomes effective in either unit when it is being driven from the other unit. The counter torque applying means may advantageously comprise a rotating friction member continuous but yieldably applying a torque to the gear unit and rotating in the same direction as the gear when the unit is used for driving. With this arrangement, when the unit is driven by the other unit, the friction member will maintain slipping frictional pressure opposing such rotation that will be insufficient to add materially to the load but adequate to maintain the gear teeth in proper engagement. The use of a separate friction element makes it practical to provide the correct anti-backlash friction conditions without affecting the main clutch action.

These and other objects and advantages of the invention will appear more fully from consideration of the detailed description which follows, in conjunction with the accompanying drawing, wherein one embodiment of the invention is illustrated. It is to be expressly understood, however, that the drawing is for the purposes of illustration and description and is not to be construed as defining the limits of the invention.

Referring now to the drawing for a more detailed description of the novel gear drive apparatus of the present invention, said drawing illustrates a duplex reversing gear train in side elevation, with the clutch construction shown in vertical central section, parts being diagrammatically indicated, the gear supports and bearings being generally omitted.

The apparatus includes two duplicate gear units, one of which will be described in detail, the corresponding parts in the other unit being designated by the same numerals marked with a prime. Considering the right-hand unit 1, which is duplicated by the left-hand unit 2, a drive gear 3 is selectively engaged by the operation of a clutch 4 with the lead gear 5 of a gear train 6 having a terminal gear 7 meshing with a driven gear 8. The drive gears 3 and 3' mesh with each other, and one of them, in this case 3, meshes with power gear 9 on the shaft 10 of drive motor 11, so that gears 3 and 3' are continuously driven in opposite directions.

In the illustrated arrangement, cooperating elements of clutch 4 mounted on drive gear 3 and lead gear 5 are engaged and disengaged by shifting gear 3 axially, the teeth of gears 3, 3', and 4 being sufficiently wide to remain continuously in mesh during such axial shift. The clutches 4, 4' may be thus alternatively engaged in various ways. When the gearing is part of a larger system, the latter will include suitable clutch-operating means; but for simplicity a somewhat diagrammatic arrangement for manual engagement of either clutch is shown. This comprises a shaft extension 12 of drive gear 3 slidable in mounting plate 13 and bearing against rocker arm 14, which is pivotally mounted on supporting bracket 15 attached to plate 13. Either end of rocker arm 14 may be depressed by handle 16 and held in depressed position by a suitable latch, such as retaining pin 17 fitting into a socket 18 in bracket 15.

Clutch 4 is of appropriate type, advantageously having frictional engagement for smooth operation; and a suitable arrangement for engaging and disengaging the clutch is provided. Said clutch as shown comprises a friction ring 19 fixed to drive gear 3 and bearing against clutch plate 20 on lead gear 5 when gear 3 is depressed into driving position.

A separate friction element engages lead gear 5 continuously so as to exert a counteracting torque thereon as already indicated. In the embodiment illustrated, this element, indicated generally as 21, comprises a cylindrical block 22 carrying a friction disc 23 on its lower face bearing against the bottom surface 24 of cylinder 25, which carries clutch plate 20 as a flange at its upper edge. The cylinder 25 is fixed axially to lead gear 5, and the block 22 is splined to a downward extension 26 of the shaft of drive gear 3. Compression springs 27 seated in block 22 bear against the lower face of drive gear 3, maintaining the friction disc 23 in engagement with cylinder bottom 24 on lead gear 5 at all times, serving also to elevate drive gear 3 and lift friction ring 19 out of engagement with flange 20, thereby releasing driving clutch 4, when arm 14 is rocked to the left.

While the illustrated embodiment includes a construction in which the clutch mechanism is fixed to a drive gear and is engaged and disengaged by axial movement of the gear, an arrangement embodying inventive features, this showing is not intended as a limitation, since other arrangements for mounting and operating the clutch may be employed.

The general mode of operation will be evident from the foregoing description. When drive gear 3 is depressed and clutch 4 is engaged, gear train 6 will be driven from lead gear 5, and terminal gear 7 will rotate driven gear 8 in one direction. Gear 8 will drive gear train 6' through terminal gear 7'; but as the friction element 23' is pressed against the bottom 24' of cylinder 25' on lead gear 5', and is rotating in the direction opposite to the latter gear under these conditions, the teeth of the gears in train 6' will be kept in engagement with the same tooth faces in contact as if the latter train were being driven. Therefore, when drive gear 3 is raised, disconnecting clutch 4 and removing the drive pressure through gear 8 on train 6', there will be no backlash, the frictional pressure of element 23' and the torque applied through elements 23' to lead gear 5 being sufficient to counteract any tendency of the gear teeth of train 6' to shift out of contacting relation. Also, when clutch 4' is engaged and the direction of rotation of gear trains 6' and 6 is reversed, there will be no lost motion, since the same gear tooth faces remain in contact at all times throughout the entire gear assembly.

Thus in explanation, it may be noted that there are in each of the trains of gears 3, 5, 6, 7 and 3', 5', 6', 7' two clutches 19 and 23 in one train and 19' and 23' in the other. The torque transmission capacity of the clutches 23 and 23' is considerably inferior to that of clutches 19 and 19'. The result is that when clutch 19 is engaged there will be a heavy transmission of torque therethrough to drive gear 7, whereas there will be only a partial torque transmission in the opposite direction through clutch 23'. The result will be that, although train 5', 6', 7' will be driven by the other train, the tendency of the train 5', 6', 7' to be driven in the opposite direction by gear 3' will force the teeth of the train into such contact as to eliminate backlash when the direction of drive of gear 8 is reversed.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

An anti-backlash reversing gear train comprising two meshing drive gears, two gear units each associated with one of said drive gears, each of said gear units including a clutch operably connected to the associated drive gear, said clutch including an annular first clutch member carried by the associated drive gear, a lead gear and a second clutch member carried by the lead gear, one of said members movable into and out of engagement with the other clutch member, a friction member mounted on each drive gear concentric with the annular clutch member and bearing against the associated second clutch member carried by the lead gear, means drivingly connecting the friction member and the associated drive gear, spring means to bias said friction member so as to maintain continuous frictional engagement with said second clutch member carried by the lead gear, control means for alternatively operating the first-mentioned clutch of each gear unit to selectively connect and disconnect its associated drive gear and gear unit, said control means operatively connected to said spring means so as to increase the biasing force applied thereby to said friction member upon the connection of its associated drive gear and gear unit through said first-mentioned clutch, a driven gear engaged by both gear units and arranged to be driven alternatively in either direction through the selectively operated clutch and associated gear unit, and the friction member associated with the other gear unit applying a relatively low torque to said other gear unit and a torque less than the torque applied to said other gear unit through the driven gear by the selectively operated clutch.

References Cited in the file of this patent

UNITED STATES PATENTS

| 1,570,372 | Buckingham | Jan. 19, 1926 |
| 2,196,231 | Ridgway | Apr. 9, 1940 |
| 2,590,029 | Minosky | Mar. 18, 1952 |
| 2,659,598 | McLagan | Nov. 17, 1953 |

FOREIGN PATENTS

| 59,717 | Sweden | Oct. 6, 1919 |